(12) United States Patent
Czajkowski et al.

(10) Patent No.: US 7,839,034 B2
(45) Date of Patent: Nov. 23, 2010

(54) ELECTRICITY GENERATOR AND AN INSTALLATION COMPRISING A LIGHTING TOWER POWERED BY SUCH A GENERATOR

(75) Inventors: François Czajkowski, Linars (FR); Jacques Saint-Michel, Angouleme (FR); Philippe Manfe, Linars (FR); Hédi Kharrat, Saint-Michel (FR); Michel Renard, Fleac (FR); Luc Moreau, Angouleme (FR)

(73) Assignee: Moteurs Leroy-Somer, Angouleme (FR)

( * ) Notice: Subject to any disclaimer, the term of this patent is extended or adjusted under 35 U.S.C. 154(b) by 217 days.

(21) Appl. No.: 12/183,881

(22) Filed: Jul. 31, 2008

(65) Prior Publication Data
US 2009/0058212 A1 Mar. 5, 2009

Related U.S. Application Data

(60) Provisional application No. 60/991,191, filed on Nov. 29, 2007.

(30) Foreign Application Priority Data
Aug. 6, 2007 (FR) .................... 07 56955

(51) Int. Cl.
| H02K 1/10 | (2006.01) |
|---|---|
| H02K 3/16 | (2006.01) |
| H02K 3/20 | (2006.01) |
| H02K 17/28 | (2006.01) |
| H02K 19/26 | (2006.01) |
| H02K 21/00 | (2006.01) |
| H02K 23/20 | (2006.01) |
| H02K 23/22 | (2006.01) |

(52) U.S. Cl. .................. 310/73; 310/90; 310/156.01; 310/186; 310/216.008; 310/112; 310/153

(58) Field of Classification Search ............... 310/73, 310/90, 156.01, 186, 216.008, 112, 153; H02K 1/10, H02K 3/16, 3/20, 17/28, 19/26, 21/00, 23/20, H02K 23/22
See application file for complete search history.

(56) References Cited

U.S. PATENT DOCUMENTS
4,181,929 A * 1/1980 Barber et al. ............... 362/192
(Continued)

FOREIGN PATENT DOCUMENTS
| EP | 1 261 102 A2 | 11/2002 |
|---|---|---|
| GB | 687 591 | 2/1953 |
| JP | 2001 218406 | 8/2001 |
| JP | 2006 304397 | 11/2006 |

OTHER PUBLICATIONS
English Abstract of JP2001218406.
(Continued)

Primary Examiner—Quyen Leung
Assistant Examiner—John K Kim
(74) Attorney, Agent, or Firm—O'Brien Jones, PLLC

(57) ABSTRACT

The present invention provides an electricity generator for a lighting tower having a plurality of discharge lamps, each lamp being of power greater than 750 W, the generator being arranged to be driven by an engine, the generator being a multiphase generator having n phases, where n is an even integer, each phase being independent in a magnetic circuit that is common to all of the phases and being configured to power one lamp, the generator comprising a rotor with permanent magnets, having 3 n poles, and a stator concentric with the rotor and subjected to the radial magnetic flux from the magnets, the stator comprising a stack of laminations of silicon iron having a silicon content greater than 0.5% and of individual thickness greater than 0.35 mm, defining 4 n magnetic circuit teeth, with every other tooth carrying a winding.

11 Claims, 1 Drawing Sheet

U.S. PATENT DOCUMENTS

| | | | |
|---|---|---|---|
| 4,390,378 A * | 6/1983 | Rastogi | 148/111 |
| 4,757,926 A * | 7/1988 | Leo | 224/178 |
| 5,808,450 A * | 9/1998 | Chula et al. | 322/22 |
| 6,094,011 A * | 7/2000 | Notsu | 315/78 |
| 2002/0175644 A1* | 11/2002 | Su | 318/254 |
| 2003/0173924 A1* | 9/2003 | Blase et al. | 318/538 |
| 2004/0245879 A1 | 12/2004 | Hirzel et al. | |
| 2006/0131978 A1* | 6/2006 | Hirzel et al. | 310/168 |
| 2006/0244333 A1* | 11/2006 | Jeung | 310/186 |
| 2007/0296298 A1* | 12/2007 | Jones et al. | 310/179 |

OTHER PUBLICATIONS

English Abstract of JP2006304397.
English Abstract of EP 1 261 102 A2.
French Search Report from FR 07 56955 dated May 15, 2008 (2 pages).

* cited by examiner

ELECTRICITY GENERATOR AND AN INSTALLATION COMPRISING A LIGHTING TOWER POWERED BY SUCH A GENERATOR

This non provisional application claims the benefit of French Application No. 07 56955 filed on Aug. 6, 2007 and U.S. Provisional Application No. 60/991,191 filed on Nov. 29, 2007, both of which are incorporated by reference herein.

The present invention relates to an electricity generator for powering a lighting tower.

BACKGROUND

Such a generator is commonly driven by an internal combustion engine.

In conventional manner a lighting tower comprises a plurality of discharge lamps, usually four lamps, and in order to start them they require a voltage to be relatively high.

The light efficiency of the lamps depends on the frequency of the electrical power supply, and it tends to increase with increasing frequency.

In known installations, the lamps are powered with the help of ballasts that produce the high voltage for starting the lamps. The presence of such ballasts increases the cost of the installation.

US 2004/0245879 discloses an axial flux generator having a rotor disk of with a pole count that is high. The stator is made with a low-loss magnetic material that is relatively expensive. In addition, the rotor needs to be positioned accurately in the axial direction relative to the stator, since the airgap is determined by its axial clearance. That makes it necessary to provide a bearing that acts as an axial abutment on the engine or on the generator, and that can increase the cost thereof.

There exists a need to benefit at low cost from an installation that comprises a lighting tower, while also providing satisfactory light efficiency.

The invention seeks to satisfy this need.

SUMMARY

The invention provides an electricity generator for a lighting tower having a plurality of discharge lamps, each lamp being of power greater than 750 watts (W), the generator being arranged to be driven by an engine, the generator being a multiphase generator having n phases, where n is an even integer, each phase being independent in a magnetic circuit that is common to all of the phases and being designed to power one lamp, the generator comprising a rotor with permanent magnets, having 3 n poles, and a stator concentric with the rotor and subjected to the radial magnetic flux from the magnets, the stator comprising a stack of laminations of silicon iron having a silicon content greater than 0.5% and of individual thickness greater than 0.35 millimeters (mm), defining 4 n magnetic circuit teeth, with every other tooth carrying a winding.

The above characteristics make it possible to generate a voltage that is high enough to start the lamps, thereby making it possible to eliminate the ballasts, and thus reduce the cost of the installation.

In addition, the radial flux makes axial positioning of the rotor relative to the stator less critical, thereby enabling the generator to be made using a single bearing, if so desired, which can simplify the construction thereof.

The polarity of the generator, in particular when n is equal to 4, provides both an electrical frequency that is sufficiently high to obtain satisfactory light efficiency, and magnetic losses that are sufficiently low to make it possible to use conventional silicon iron laminations that are relatively inexpensive. In addition, such polarity can make the machine simpler to make.

In an embodiment, the generator has a single bearing supporting the shaft of the rotor.

The inductance per phase may be greater than or equal to 50 millihenries (mH), for example lying in the range 60 mH to 80 mH.

By way of example, the laminations of the stator may be those sold under the reference MS270 50A (in accordance with International Electrotechnical Commission (IEC) standard 404-8-4).

The impedance per phase may be greater than 78 ohms ($\Omega$) and can make it possible to obtain an unloaded voltage greater than 710 volts (V) peak-to-peak and a loaded voltage less than 270 V root mean square (rms).

The magnets may be placed on the surface.

The generator may comprise a plurality of identical machines on a common shaft. The generator may alternatively comprise different machines on a common shaft. The term "machine" should be understood as comprising a stator and a rotor interacting as a unit to produce electricity.

The invention also provides an installation comprising a lighting tower having a plurality of discharge lamps and an electricity generator as defined above, the lamps being powered without ballasts.

The installation may also include an engine for driving the electricity generator, the engine being arranged to rotate at 2500 revolutions per minute (rpm) ±30%, for example.

BRIEF DESCRIPTION OF THE DRAWING

The invention can be better understood on reading the following description of a non-limiting embodiment thereof and on examining the accompanying drawing, in which.

Figure 1:
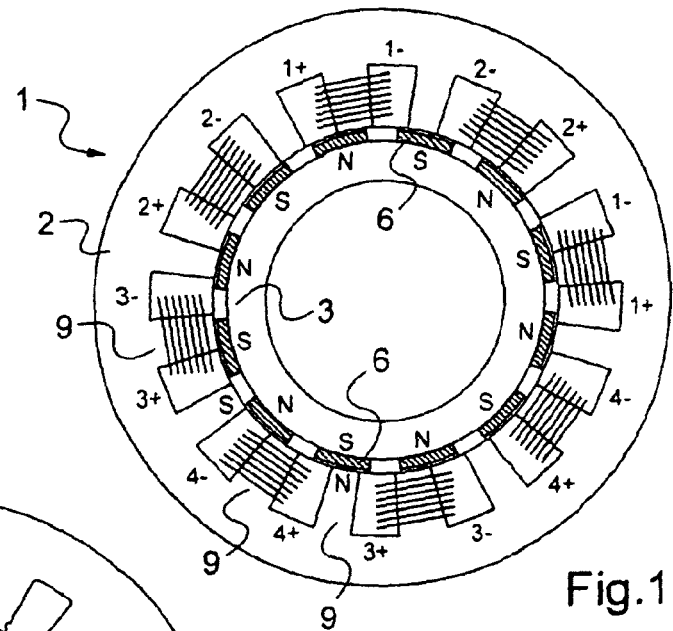
FIG. 1 is a diagrammatic cross-section through an example of a generator made in accordance with the invention.
Figure 2:
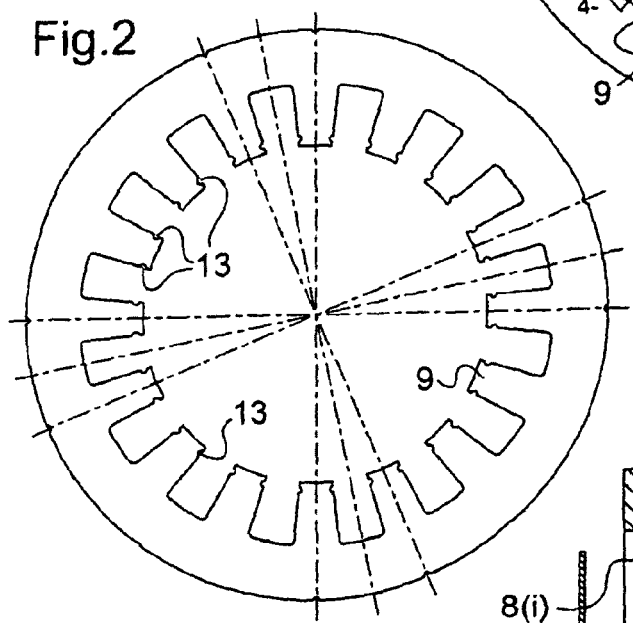
FIG. 2 shows a lamination of the stator in isolation.
Figure 3:
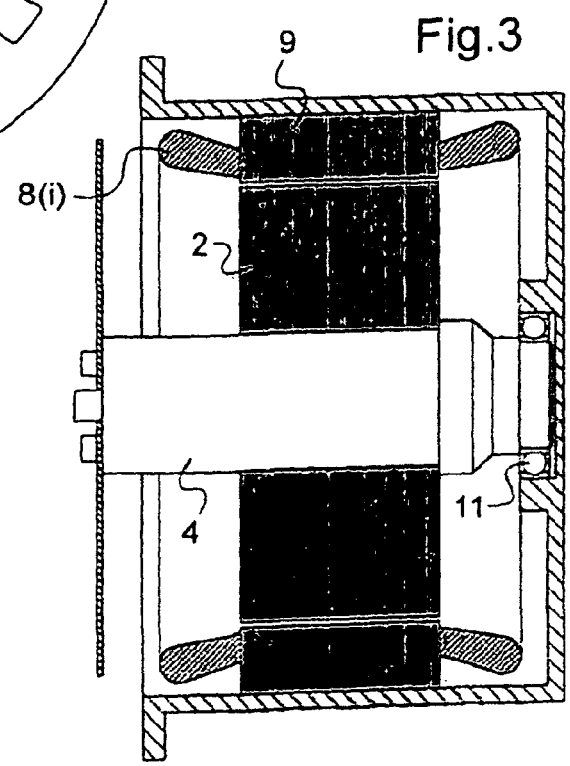
FIG. 3 is a diagrammatic axial section of the FIG. 1 generator.

The electricity generator 1 shown in FIGS. 1 to 3 comprises a stator 2 and an inner rotor 3 concentric with the stator.

MORE DETAILED DESCRIPTION

The outside diameter of the generator is close to 305 mm, for example, and its length is close to 155 mm, with the invention naturally not being limited to particular dimensions.

As can be seen in FIG. 3, the rotor 2 has a shaft 4 that can be coupled to the outlet shaft of an engine (not shown). The shaft 4 may be supported by a single ball bearing 11 of the generator 1.

In the example described, the rotor has magnets 6 on its surface, there being twelve such magnets of polarities that alternate in the circumferential direction.

The magnets 6 may be bonded to the shaft adhesively, and a band may overlie them, where necessary.

By way of example, the magnets 6 are based on neodymium, iron, and boron, and they generate radial flux towards the stator. The stator has sixteen teeth 9 without pole shoes and with a winding on every other tooth. The teeth 9 may include notches 13 for receiving spacers for retaining windings $8_{(i)}$, not shown.

The stator 2 comprises a stack of laminations made of silicon iron, e.g. of reference M270 50A, each of individual thickness greater than 0.35 mm, with a silicon content greater than 0.5%.

The windings $8_{(1)} \ldots 8_{(4)}$ may be made prior to being mounted on the teeth 9. Each winding $8_{(1)} \ldots 8_{(4)}$ comprises about 300 turns per tooth, for example.

Each phase of the generator comprises two windings connected electrically in series and spaced apart by three teeth 9, as shown in FIG. 1.

Figure 4:
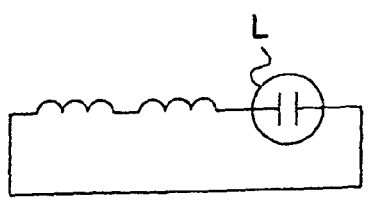
FIG. 4 is an electrical schematic for one phase of the generator connected to a discharge lamp of the lighting tower.

For each phase, the windings are electrically connected in series as shown in FIG. 4, so as to power a corresponding discharge lamp L of the lighting tower.

The lamps used are halogen lamps of power greater than 750 W, e.g. close to 1000 W.

As examples of such lamps, mention can be made of those sold by the supplier GTE under the reference Sylvania Super Metalarc Vertical MS1000/BU.

By way of example, the engine is a diesel unit arranged to drive the generator at a speed of rotation of 2500 rpm.

When the generator is driven at such a speed, the electrical frequency f is about 250 Hz in application of the formula: $f_{electric}$=(no. of pairs of poles)×(speed of rotation in rpm)/60.

At such a frequency, the discharge lamps retain satisfactory efficiency.

In the example described, the impedance per phase of the generator is close to 110Ω.

With such an impedance, the unloaded voltage may, for example, reach as much as 450 V rms and more than 710 V peak-to-peak, and the voltage when loaded is about 250 V rms, and more than 300 V peak-to-peak.

This enables the lamp L to be started without a ballast.

The n phases of the machine are magnetically independent in a common magnetic circuit. The unloaded voltage of a phase depends little or not at all on the state of the other phases (loaded or unloaded). It is also possible to start the lamps in succession or simultaneously.

Naturally, the invention is not limited to the example described.

In particular, it is possible to modify the speed at which the generator is driven.

The term "comprising a" should be understood as being synonymous with "comprising at least one".

Although the present invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A multiphase electricity generator for a lighting tower, the multiphase generator comprising: n phases, n being an even integer, wherein each phase of the n phases is independent in a magnetic circuit that is common to all of the phases of the n phases and where each phase of the n phases is configured to power one lamp of a power greater than 750 W associated with the lighting tower; a rotor comprising permanent magnets providing 3 n poles; and a stator concentric with the rotor and subjected to a radial magnetic flux from the permanent magnets, the stator comprising a stack of laminations of silicon iron, each lamination of the stack of laminations having a silicon content greater than 0.5 percent and a thickness greater than 0.35 mm, the stack of laminations defining 4 n teeth, wherein every other tooth of the 4 n teeth carries a winding.

2. A generator according to claim 1, having a single bearing supporting the shaft.

3. A generator according to claim 1, in which the laminations are those sold under the reference MS270 50A.

4. A generator according to claim 1, wherein an impedance per phase is greater than 78Ω and leads to an unloaded voltage greater than 710 V peak-to-peak and a loaded voltage that is less than 270 V rms.

5. A generator according to claim 1, wherein the generator is driven at 2500 rpm ±30%.

6. A generator according to claim 1, comprising a plurality of machines on a common shaft.

7. A generator according to claim 1, wherein the magnets are disposed on a surface of the rotor.

8. A generator according to claim 1, wherein the generator has four phases.

9. An installation comprising a lighting tower having a plurality of discharge lamps and an electricity generator as defined in claim 1, the lamps being powered without ballasts.

10. An installation according to claim 9, including an engine for driving the electricity generator.

11. The generator of claim 8, the stator having sixteen teeth and the rotor having twelve poles.

* * * * *